(12) United States Patent
Kruse

(10) Patent No.: US 7,736,509 B2
(45) Date of Patent: Jun. 15, 2010

(54) PROBIOTIC SYSTEM AND AQUACULTURE DEVICES

(76) Inventor: Alan Kruse, 2082 Salto Dr., Hacienda Heights, CA (US) 91745

( * ) Notice: Subject to any disclaimer, the term of this patent is extended or adjusted under 35 U.S.C. 154(b) by 163 days.

(21) Appl. No.: 12/019,418

(22) Filed: Jan. 24, 2008

(65) Prior Publication Data

US 2008/0210632 A1    Sep. 4, 2008

Related U.S. Application Data

(60) Provisional application No. 60/897,085, filed on Jan. 24, 2007.

(51) Int. Cl.
*C02F 3/32* (2006.01)
*A01K 63/04* (2006.01)

(52) U.S. Cl. .................. 210/602; 210/611; 210/631; 210/906; 119/227

(58) Field of Classification Search .......... 210/601, 210/602, 610, 611, 612, 631, 167.21, 167.22, 210/170.02, 170.09, 170.1, 170.11, 906; 119/215, 227, 231, 260
See application file for complete search history.

(56) References Cited

U.S. PATENT DOCUMENTS 4,391,887 A * 7/1983 Baumgarten et al. .......... 435/42
4,432,869 A * 2/1984 Groeneweg et al. ......... 210/602
5,580,458 A * 12/1996 Yamasaki et al. ........... 210/609
5,711,983 A * 1/1998 Kyle et al. ................. 426/635
5,840,182 A * 11/1998 Lucido et al. ............... 210/202
5,947,057 A * 9/1999 Perez et al. ................. 119/211
2004/0101944 A1* 5/2004 Willuweit et al. ........... 435/243

FOREIGN PATENT DOCUMENTS

JP      07-256269    * 10/1995
JP      07-265897    * 10/1995

* cited by examiner

*Primary Examiner*—Fred Prince
(74) *Attorney, Agent, or Firm*—Biotech Beach Law Group PC; Raymond Wagenknecht

(57) ABSTRACT

An aquaculture or wastewater effluent water quality device to improve water quality and food supply in an aquaculture pond or body of water by incubating beneficial microbes in a temperature controlled environment and systematically releasing them to the surrounding water, allowing the beneficial microbes to perform sanitation functions and to help such systems or water bodies overcome the natural production of harmful microbial species without substantially heating or cooling the entire system any more than is required by the present state of the system or body of water or the inhabitants thereof.

2 Claims, 1 Drawing Sheet

PROBIOTIC SYSTEM AND AQUACULTURE DEVICES

CROSS REFERENCE TO RELATED APPLICATIONS

The present application claims benefit of priority to U.S. patent application Ser. No. 60/897,085 filed on Jan. 24, 2007, which is herein incorporated by reference in its entirety

TECHNICAL FIELD OF THE INVENTION

The present invention relates generally to the maintenance or improvement of an aquatic environment and more specification to devices, systems and methods for the propagation and delivery of beneficial organisms to an aquatic environment.

BACKGROUND OF THE INVENTION

Food sufficiency is the first requirement of survival, and the amount of food required by a given population depends upon the aggregate size of the population. Among available food sources, aquatic species can play a significant role. Though advanced fishing techniques and equipment may significantly increase the size of the catch; fishery resources are at the same time are being rapidly depleted. Aquaculture has become a viable alternative to replace shortfalls in the marine catch, and enhancement of aquatic bodies with appropriate nutrients is believed to be a viable alternative for governments and fisheries whom wish to address the growing problem.

In the initial step of aquaculture production, fresh or seawater is directly introduced into an aquaculture pond conditioned to provide a suitable habitat for the fish to thrive. Unfortunately, excrement from the fish and unconsumed feed material contaminate the water in the pond resulting in the propagation of algae, pathogenic and beneficial bacteria, zooplankton and/or phytoplankton, and parasites. Decaying excrements and residual feed generate hazardous gases and threaten fish propagation. As a result, the fish can become infected or die, causing substantial loss to the owner. To avoid this, the owner will periodically filter the water, often using only filtration devices for preliminary filtration. This preliminary filtration does remove certain foreign matter and suspensions from the water; but fails to remove algae, pathogenic bacteria of zooplankton and phytoplankton, parasites and hazardous gases. Making the water in the pond cleaner and providing an optimal living environment for the fish is one of the topics pending satisfactory solution in the aquaculture industry.

Substantial work has been done to improve filtration methods, and in particular, the technology of supplementing beneficial bacteria colonies with improved substrates and devices is known. There are also cultured biological amendments available to improve the ratio of beneficial bacteria in any given system. After such amendments are added to a body of water, the temperature of the entire system may be elevated or lowered to accommodate the growth of the bacteria. Other devices are also available to accommodate the reproductive capabilities of beneficial bacteria, most notably; the improved substrates of recently patented inventions, and further, the addition of feed supplements known in the industry as Microbial Controlled Aquaculture (MCA). MCA provides a substantial basis, but does not describe the inoculation, incubation and delivery technology described herein, nor does it provide the basis for efficient and relevant temperature control studies which focus on the microbial colonization and multiplication as a separate process that requires special temperature or propagation considerations to maximize efficiency and energy conservation. MCA simply feeds the microbes at the prevailing temperature of the system, and assumes that both the bacteria and the target species will benefit.

U.S. Pat. No. 7,082,893 teaches the benefit of biological control in a filtration system, but fails to address the temperature parameters in a meaningful way to reduce the substantial cost of heating or cooling a large body of water. The '893 patent also fails to suggest a significant benefit of the present invention, i.e. to encourage highly intensive reproduction of beneficial organisms, such as beneficial bacteria within the system without significantly raising or lowering the temperature of the system in order to improve the efficiency of filtration. A bacterial culture may or may not thrive at the same temperature as the targeted production species although it might favor certain surfaces to adhere to, and such surfaces can be engineered to accommodate shearing of the bacterial colonies at advantageous sizes. The processes involved in the '893 patent do not suggest the incubation of the bacterial cultures at temperatures other than the system wide parameters.

US Patent publication no. 20060275324 teaches the beneficial effect of probiotic treatments for aquaculture, but instead of generalizing their invention to a convenient incubator that could be globally applied in any body of water, the inventors specifically prevent specific pathogenic bacteria and enhance specific beneficial organisms by selective breeding in presumably sterile conditions, as well as utilizing highly specialized incubators for lab experiments and production. They do not propose the solution of having incubator stations with various probiotic and beneficial organisms provided to an aquaculture system or body of water in a continuous or deliverable manner through a relatively simple and inexpensive technology.

In view of prior technologies, there remains a need for devices and methods that selectively propagate and deliver beneficial organisms to aquatic environments. Furthermore, there exists a need to reduce the stress placed on aquatic environments when cultivating a variety of organism. Still further, the need for strengthening the food web and increasing nutrition at the lowest levels of marine life appears to have substantial significance in the face of population increases versus the amount of arable land and agricultural watershed available worldwide.

SUMMARY OF THE INVENTION

The present invention addresses the deficiencies in previous devices and methods of aquaculture and provides related benefits. The present invention allows the cultivation of beneficial organisms while reducing or minimizing the propagation or effect of harmful organisms, waste products and analytes. The present invention operates by providing an aquaculture device that incubates and delivers a beneficial organism to an aquatic environment in need thereof. The device is capable of maintaining appropriate incubation conditions independent of the conditions present in the outer aquatic environment, which may reduce environmental stress on species within the environment and will reduce energy consumption associated with aquaculture systems.

In one aspect of the present invention, an aquaculture device is disclosed including an incubator for incubating a beneficial organism and a delivery device for delivering an incubated organism to an aquatic environment in need thereof. Delivery occurs periodically, such as during predetermined time periods, or in response to a predefined condition, such as a surpassing a compound or analyte concentration in the environment and the like. The aquaculture device optionally includes a microprocessor device for sensing at least one environmental condition or analyte and providing a command in response thereof to the incubator, the delivery device, a peripheral attachment or a biofilter used in combination with the device.

The incubator is isolated from the aquatic environment to be treated and is self regulating (e.g. maintains its temperature or growth parameters independent of the aquatic environment). Although functionally isolated, the incubator may be placed within the aquatic environment for ease of delivery or function. The incubator may be fully or partially submerged, float on top or be located remote from the aquatic environment to be treated.

A variety of beneficial organisms may be propagated and delivered. Beneficial organisms are those that contribute to the health of the aquatic environment such as those useful as a food supply or those which process, fix or alter nutrients for the benefit of the environment. Among these include beneficial bacteria, daphnia, brine shrimp, rotifer, planktons, fungus, aquatic organisms, marine organisms and the like. Non-limiting examples of fungi include yeasts, molds (including penicillin and ethanol producing fungus).

The aquaculture device may limit, suppress or prevent the propagation of deleterious organisms in the incubator or in the aquatic environment. Selection of beneficial organisms over deleterious organisms may include manipulation of growth conditions such as light exposure, nutrient concentration, the presence of selectable compounds, temperature and the like. In various embodiments the aquaculture device mitigates or regulates the concentration of ammonia, nitrites, nitrates, carbohydrates, phosphors and sulfurous material in the aquatic environment.

The present device includes a variety of embodiments including those which provide a nutrient dispensing system for dispensing one or more nutrients into the aquatic environment or the incubator, a sorting device for sorting the beneficial organism according to a sortable characteristic such as colony size prior to incubation or delivery. The aquaculture device may also include recirculating pumps, aerators, additional dispensers, filters and the like.

The device of the present invention can be adapted for use with a variety of aquatic environments including waste water systems, water purification systems, ponds, lakes, rivers, streams, bays, oceans, aquariums, fish farms and the like. The present device may be adapted for any aquatic environment in which the maintenance of a beneficial organism will benefit the aquatic environment. In one embodiment, the present invention is used to mitigate the environmental effect from a flood.

In another aspect of the present invention, an aquaculture system is provided including multiple aquaculture devices. Each aquaculture device may include one or more incubators, such a primary incubator for incubating a primary beneficial organism and a secondary incubator for incubating a second beneficial organism. The secondary incubator may provide fuel or a food supply for the primary incubator. In various embodiments, the system is in communication with one or more processing systems or a central processing system for processing information about the aquatic environment or the incubator. In still further embodiments, the one or more processing systems control the incubation conditions or delivery instructions to one or more aquaculture devices.

In another aspect of the present invention, a method of maintaining or improving an aquatic environment is provided including providing an aquaculture device of the present invention, fluidly communicating the device to an aquatic environment and inoculating the incubator with a beneficial organism. In another aspect of the present invention the aquaculture device is used in a method to reduce, deplete, or alter nutrients from the aquatic environment.

DETAILED DESCRIPTION OF THE INVENTION

Figure 1:
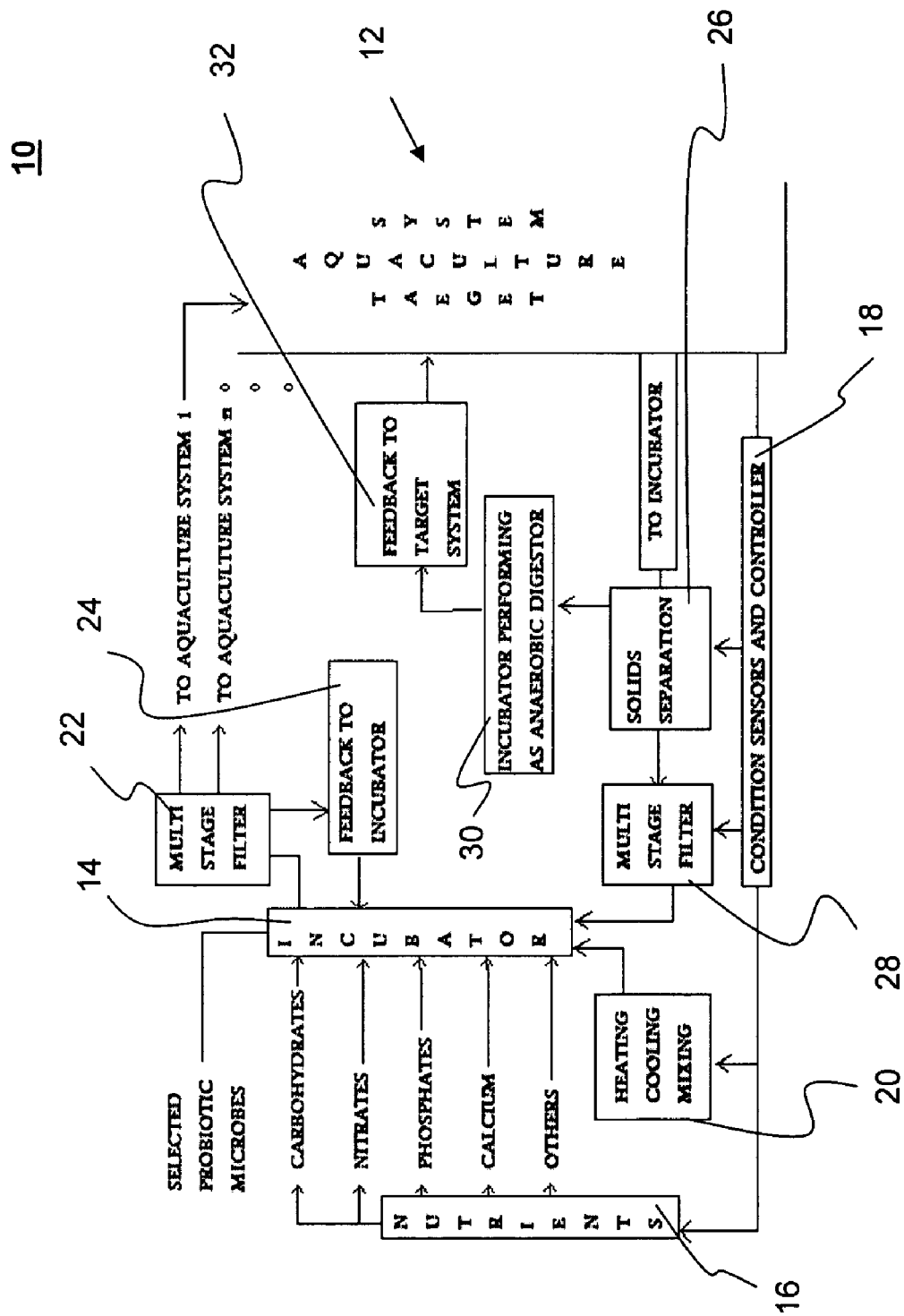
FIG. 1 is a flow chart depicting an aquaculture system 10 of the present invention including the relationship between a target aquaculture system (also referred to as an aquatic environment) 12 and the incubator 14. Selected probiotic microbes are added to the incubator 14. A nutrient supply source 16 adds nutrients including carbohydrates, nitrates, phosphates, calcium, and optionally others. Condition sensors and controllers 18 regulate the incubator's 14 environmental condition by sensing conditions and instructing structures or devices for heating, cooling or mixing 20 of the environment. From the incubator 14 a multistage filter 22 communicates with one or more target aquaculture systems 12 and can optionally feedback 14 to the incubator. The target aquaculture system 12 may communicate with the incubator 14 via a means or structure to separate solids 26 and a multistage filter 28, each of which is also in contact or controlled by condition sensors and controller 18. The means or structure for solids separation 26 may also communicate with an incubator performing as an anaerobic digester 30 which provides feedback 32 to the target aquaculture system 12.

This invention may be embodied in many different forms and should not be construed as limited to the embodiments set forth herein. Rather, these embodiments are provided so that this application will be thorough and complete, and will fully convey the true scope of the invention to those skilled in the art.

The primary purpose of the present invention is to provide a system for improving aquaculture water quality, which can be use to grow or maintain a target aquatic species including a fish population, an invertebrate population or to treat a body of water in need thereof. To achieve this purpose, beneficial organisms, such as beneficial bacterial colonies, are substantially multiplied and augmented in the incubator and then released into the surrounding water without the necessity of regulating the conditions (e.g. temperature or nutrient concentration) of the entire mass of the aquatic environment, as is the current state of the art.

I. The Aquaculture Device

As will be realized by one skilled in the art to which the present invention belongs, the aquaculture device is designed to surpass the existing technology by providing an incubator on-site which is thermostatically controlled and isolated from the ambient conditions (e.g. temperature or analyte concentration) of the immediate environment, thereby enhancing the growth prospects of selected probiotic strains, while discouraging the growth of pathogenic and/or deleterious strains. The present invention does so by means of specific temperature control, nutrients, selection conditions and/or by means of using selected exclusive inoculants as described herein. The incubator may include a pump for recirculation, or a motorized or air-driven physical mixing structure. The incubator will function in a standalone capacity, with or without specific inoculants, and can generally reduce pathogenic growth by selective temperature or environmental control, as well as through the use of more general inoculants. In addition, the implementation of the replicative technology described herein within or near the aquaculture system will provide significant cost advantages compared to the methods and equipment currently in use.

In the preferred embodiment, a nominally saline to marine (seawater) culture fluid is derived from obtaining ocean water or a marine water mix like those found in typical pet stores, and diluting it to the desired salinity. Flour (bleached or whole wheat), nitrates, phosphates, calcium, sulfur, magnesium, and additional micronutrients are added to manage the variability of the source waters and to accommodate the dietary requirements of the targeted species of fungi, microbes, algae, and planktons. Flour was found to be a preferred carbohydrate, as sugar tended to cause many young plankton to stick to the container and die. Phosphates were found to be crucial in the formation of lipids, but toxic in high concentrations. A rule of thumb for assimilation of the phosphate was empirically determined to maintain concentration near 0.5 ppm, as levels above 2 ppm rapidly became unmanageable due to decreases in the population of phosphate assimilating microbes. Nitrates were repeatedly added to the incubator and grow out vessels and were rapidly assimilated at ambient temperatures after sufficient microbial colonization had occurred. Heat was applied to the incubator whenever feeding habits in the grow out vessels appeared to outpace the existing reserves. The crude food product was then added to the grow out tanks as necessary, and the lipid base was supplemented with green vegetable materials which had been pureed in a blender. The bacteria in the grow out tanks appeared to consume the fungal mixture and combine it with the nutrients and/or enzymes from the vegetables forming a diet for the plankton which was rich in long chain fatty acids without the necessity of significant lighting as would be used in the propagation of certain algae species for similar end results. A second stage incubator with lighting and temperature controls could be implemented for larger scale operations to further accelerate the conversion from raw lipids to long chain fatty acids. A single 5 gallon incubator serviced the approximately 800 gallons of the test growout facility with a duty cycle that was in idle more than 75% of the time. No biofilters were necessary. The present invention provides a device and process of producing Omega complex (Omega-3,6,9) fatty acids with minimal lighting, as well as a process for growout of various plankton to seedstock, fingerlings, and beyond.

In one embodiment, which may be the simplest embodiment, a quantity of water is inoculated with beneficial microbes and a food supply for the microbes and the inoculated water is placed in a small processing container (provided as the incubator). In this simplest embodiment; a pan, a heating or cooling source and a thermometer are the only required equipment. A method of delivering an incubated organism is also required. The temperature of the incubator is monitored using the thermometer and controlled by the heating or cooling source to allow maximum growth and reproduction of the beneficial microbes via heating or refrigeration. At the end of the incubation cycle, a portion of the bacteria is delivered into the aquatic environment or body of water as an external inoculation, and the nutrients and water are refreshed to start production of a new batch with the remaining material in the incubator as the internal inoculants for a repeat of the process. Nutrients and physical adaptations may be added to the aquaculture system or body of water to encourage the fresh external inoculation to expand efficiently based on the external ambient temperature and stasis criteria.

The environment of the incubator is controlled independent of the environmental conditions of the aquatic environment to be treated. The incubator may be an insulated container, such as a Styrofoam insulated container, having suitable surfaces for proper growth or attachment of the beneficial bacteria. The incubator may remain in a static state or may rotate to swirl its contents. The incubator may include a circulation means such as a pump for circulation of its contents and may be constructed from any substantially nonporous material, such as plastic, glass, acrylic glass, polypropylene, polystyrene and the like. A heating and cooling means such as a heating or cooling element may be permanently or removably attached to the incubator or may float freely. The heating and cooling means may further incorporate a thermometer to detect the temperature of the incubator's contents and adjust the temperature in response thereto.

The contents of the incubator correspond to those required or desired by the beneficial organism to be propagated. A variety of culture fluids are known in the microbiotic arts and may be used with the present invention. Nutrients may be added to increase propagation of desired cultures or to inhibit propagation of undesired cultures. Selective antibiotics or selectable markers may be used in combination with antibiotic resistant or selection resistant desired strains of bacteria.

The temperature range within the incubator may vary and is not limiting. The temperature may depend, at least in part, on the desired beneficial organism. While particular strains may vary, many bacteria optimally grow at about 37° C. The temperature may be temporarily raised above a threshold for dangerous or deleterious bacteria, and the device may effectively be "pasteurized" for most beneficial performance. After each run or use, a fresh batch of inoculant could be required for optimal performance and the fresh inoculant might be scavenged from the device and cloned as known to those skilled in the microbiotic arts and/or processed or obtained from a lab which verifies its suitability, functionality, and beneficial effect.

Oxygen, carbon dioxide, sugars, acids, bases; and/or nitrogenous, phosphoric, or trace nutrients may be introduced into the incubator as needed by the beneficial bacteria, or as needed by the recirculative system or body of water; including, but not limited to fish oils, plankton cultures, and/or algae pastes which improve the nutrition available; and/or those nutrients, chemicals, gasses, or organisms which improve the stability of the system or body of water might be added at critical times in the associated processes based on the ambient temperatures and conditions.

A delivery means or delivery device delivers the incubated organism(s) to the aquatic environment. Delivery may include pumping or transporting a portion of the incubated beneficial organism.

In one embodiment, the delivery device is a pump and tube system whereby the pump is able to pump a desired amount of bacteria or organism through a tubing system to the environment to be treated. The pump may automatically start and stop in response to a detectable condition or may be manually started and stopped. In another embodiment, the delivery means is an aperture that fluidly communicates the incubator with the outer environment; however, the aperture should be sufficiently small or remain in an open configuration for a substantially short time such that the inner conditions of the incubator can be maintained independently of the outer environment as desired.

In another embodiment, the sizing of the output can be switched for different applications via mechanical means or through extended or reduced incubation periods. In another embodiment, the device can be set to idle, and maintain the inoculant in a suspended state by reducing the inputs and outputs to appropriate levels. In another embodiment, the system is cloned by taking the inoculant output of a working device and using it as the starter for a new population.

In another embodiment, the aquaculture device is adapted for placement within a fresh or saltwater home aquarium. In this embodiment, the device may include an attachment structure for attachment to the aquarium sidewall, such as one or more suction cups, or for attachment to the top of the aquarium, such as a hanger for hanging the device from a portion of the top perimeter of the aquarium. The device may provide beneficial organisms for food for vertebrates or invertebrates or for maintenance of one or more analyte concentrations.

In other embodiments, the aquaculture device of the present invention is adapted for use with an existing biofilter or a biological reactor. In still further embodiments, the biofilter or biological reactor is adapted with an incubator and delivery system such that the biofilter or biological reactor becomes, in part, an aquaculture device of the present invention. In various embodiments the system provides a temporary halt of processing for economical operation, or a slowdown of throughput to improve or optimize conditions in the incubator or filtration system, which can be detected by sensors. Thus, an incubator can be employed to optimize the growth of beneficial organisms, such as beneficial bacteria, within the biofilter or reactor, to be provided as a source of food particles for the target species when appropriately sorted or ejected from the filter or reactor and/or initiate a supplementation process to improve nutritional qualities of the food source. Such filters and reactors may be so modified to accomplish the most economical and effective operations within the scope of this invention by incorporating a bypass technology and modifications which acknowledge and incorporate the technology of temperature isolation and right sized food particles described herein. It can be perceived that such modification may be beneficial when the duty cycle may be adapted to additional waste streams as a result of the implementation of the instant technology thereby creating additional processing power for the owner of a productive system.

In other embodiments, the aquaculture device or system is adapted for use with a pond, lake, stream, river, bay, ocean and the like. Adaptations for scale may include increasing or decreasing the size or efficiency of one or more incubators or increasing or decreasing the rate of delivery. The aquaculture device can be submerged and insulated, or it can be floating and use solar energy to power the functions. Various flow controls, fluid dynamic devices, and mechanical devices could easily improve the efficiency and reduce or eliminate manual labor. A boat, a ship, or a seaplane could be so equipped that it inoculates entire stretches of ocean when a red tide occurs or is anticipated. The dead zone in the Gulf of Mexico could likely be reduced or eliminated and biologically reseeded by a fleet of boats and/or seaplanes so equipped. The dangerous effects of storm runoffs into oceans, lakes, and streams could be mitigated more efficiently and rapidly by governmental agencies and environmental groups utilizing the device.

As one skilled in the art would now appreciate, the manual and biotechnical functions of the disclosed device and processes could be streamlined by microprocessors. Microprocessors may detect the presence or absence of an environmental condition and may provide related instructions such as an increase or decrease in incubator retention or delivery, temperature adjustments for increasing or decreasing production, peripheral acclimation control, and/or nutrient adjustments for optimizing production for the immediate environment of the device or system. A microprocessor may control an entire aquaculture system incorporating multiple devices or only a single device.

II. Applications, Methods of Use and Environmental Impact

The aquaculture device and methods of the present invention have tremendous applications. Among these include home use in a personal aquarium or pond, adaptations for waste water plant use, propagation of fish in fish farms, recycling of waste, reduction of environmental impact from industrialization and biofuel applications.

The scale of the provided aquaculture device is nonlimiting. The aquaculture device may be adapted for a small aquarium by limiting production of beneficial organisms such as beneficial bacteria to desired amounts or may be adapted for large scale use. The scale may increase for aquatic environments such as ponds, lakes, or streams by increasing the volume of the incubator, increasing the rate of delivery (which may permit more efficient incubation) and the like. The aquaculture device may be adapted for larger scale use such as for rivers, large lakes, seas, portions of seas, portions of the ocean or water columns. Large scale use may include an aquaculture system incorporating multiple aquaculture devices, optionally under the control of a computer processing system.

Many wastewater plants focus specifically on the reduction of wastes, and logically control temperatures where economical; however, the body of water into which the effluent flows from a contemporary wastewater facility would likely be improved by this art. It is anticipated, and included within the present invention, that wastewater facilities can use the present technology to create a food source from certain input streams, and where feasible and practical, include separation of input streams to accommodate the aquaculture device, its implementations, and its embodiments, thereby avoiding the deleterious effects of certain waste streams and dedicating beneficial waste streams to aquaculture. In a typical wastewater facility, it is rarely necessary to re-inoculate the ponds, tanks, or effluent to achieve the desired and/or legally required result. In aquaculture, re-inoculation is virtually essential, as the waste parameters evolve according to the growth of the target species and due to the changing temperatures of the seasons, and even more rapidly in the event of system deficiencies and/or limitations.

Furthermore, in the case of an aquaculture system which focuses on certain organisms, the device can supply more optimally sized food and/or produce feed from wastes when the appropriate supplements are added and/or improve the current state of the art with respect to the creating "right sized" feed from waste materials by adding the appropriate supplements and correctly timing and/or sorting the releases.

Furthermore, in the case of an aquaculture or agricultural system which focuses on carnivorous species and/or ruminant species, and/or creates processing wastes; the device can improve the waste products significantly enough to feed filter feeding fish and/or other species when the wastes are used as nutrients and or supplements for the incubator in a controlled process, and consequently removed from the waste stream in a right sized form which is preferred by the secondary target species. Tertiary, quaternary, and iterative logic may also be applied to further reduce processing costs for an assortment of species.

Furthermore, in the case of an aquaculture system which would benefit from the addition of lime or a combination of lime and acids which neutralize the lime such as, but not limited, to nitric acid or hydrochloric acid; an additional benefit would be created by adding the lime through an incubator/reactor/fermenter type device which would help break down the cellulose of a waste stream, and could more effectively mitigate the environmental dangers of processes such as large scale tortilla production and/or the production of other food products which utilize lime in their processing. This process would also reduce the mass of the added solid waste and produce organic nutrients. The nutrients created would then be further beneficially improved by utilizing them in an aquaculture system as a feed source.

In another embodiment, the optimally sized bacterial colonies are delivered from the incubator to feed fishes or other organisms and animals, for instance: plankton, chickens, crickets, or snails. Snails are of particular significance due to the ability of some species to digest cellulose and create protein. This is an area of particular service to humans, to most fishes and insects, and to other animals; which cannot digest cellulose. The incorporation of the digestion of cellulose in an aquaculture system is another step toward complete recirculation.

In another embodiment, the beneficial bacteria are optimally sized to prevent them from being consumed, so as to improve the water conditions with their ammonia, nitrite, and nitrate removal capacities. Nitrogenous materials might also be beneficially depleted to encourage reduction of phosphates. The present invention provides cultured bacterial colonies, sorted to size and distributed among a series of additional incubators, holding tanks or systems involving organisms which will consume the colonies for food. Some organisms will eat the smaller colonies, and some organisms will eat the larger colonies. The smallest colonies can be cycled back as fresh inoculants and will grow larger with each succeeding cycle. The colonies can be right-sized for many different fish and/or land animals by extending or limiting the growth period in the incubator and by incremental additions of nutrients and/or binding materials. The sizing can be accomplished using mesh screens or nets, statically positioned filters, drum filters, disk filters, belt filters, bead filters, fluid shearing, mechanical shearing, cyclonic or centrifugal separation, or any other inventive means or combination thereof.

EXAMPLES

The examples provided are for illustration of the instant invention and are not intended to limit the scope of the disclosed invention. It will be understood that various omissions, modifications, substitutions and changes in the forms and details of the device described and in its operation can be made by those skilled in the art without departing in any way from the spirit of the present invention.

Example 1

Assembling an Aquaculture Device

An aquaculture device capable of incubating and delivering a beneficial bacteria to an aquatic environment is assembled for testing. The aquaculture device includes an incubation chamber, a means to monitor and regulate the temperature and a delivery means. For sake of the present example, an aquatic environment is constructed for demonstration of delivery.

Establishing a Test Aquatic Environment to Be Treated

A 350 gallon "food grade poly" stock tank is used as the aquatic environment, which is to be treated. These tanks are available through some livestock supply houses and feed stores. A biosecure water source from an existing aquaculture system is strongly advised. Obtaining a tank from a clean source is also recommended. The tank can be cleaned with a bleach solution as described by Dr. Sato in the Manzanar Project (Report October 1998: Manzanar Project From Dr. Gordon Sato). Follow the mixing and safety instructions for household sanitation on the label of the Bleach, and do not use bleach which contains additives such as a perfume ingredient. After cleaning, the tank should set a few days before or after adding the water. Seawater, or a suitable substitute formulation should be added to an appropriate fill line which allows for the possibility of some rainfall without overflow.

About ¼ cup of biosecure sludge from a supposedly "recirculating" aquaculture system should be added to the tank, but animal manure can be substituted when necessary. The animal manure should be pasteurized to ensure that it biosecure. About a half a cup of the pasteurized manure should be added to the tank with the water that the manure was processed in. The seawater was not pasteurized because it is more likely that the seawater contains only beneficial bacteria, and it is clearly better to avoid using polluted seawater, but if necessary, polluted seawater can be used if it is pasteurized, but severely polluted water should still be avoided. A biosecure waste stream from an existing marine or brackish aquaculture system is preferred above any other.

Incubator

For sake of example, a 5 gallon bucket made of food grade plastic is provided as the primary incubation chamber. A hole is drilled or cut into the side of the bucket, as close to the top as structural design of the bucket permits. The hole should be about one inch in diameter. The bucket is placed generally about the middle of the 350 gallon tank and placed on bricks or rocks for support the bucket. The bucket should be sanitized with Dr. Sato's chlorine concentration, and the bricks or rocks by pasteurization. A piece of solar water blanket as used in swimming pools can be secured to the bucket to act a as a thermal barrier to insulate the incubator from the outer aquatic environment. The bucket should be located as close to the center of the tank as possible and the hole in the side should be just above the fill line of the tank to represent an isolated process.

The temperature of the incubator is regulated by use of a thermometer and by adding hot and cold water (or crushed ice) to maintain the desired temperature. However the present invention includes an automated heating and cooling system such as an independent temperature controlled heating unit found in many pet supply stores.

Two small jars, about the size of baby food jars, are filled with sticks and leaves from a non-poisonous plant. The small jars will represent a simple replicative process for anaerobic bacteria. The tops of the jars should have a ⅛" hole in them and the tops should be screwed on after filling the jars to the top with seawater. If possible, the tops should be plastic, but the typical metal lid should withstand the seawater and anaerobic corrosion for a year or two. The jars should be placed on the bottom of the bucket, and a few short lengths of PVC pipe should be laid flat between them. The PVC should be short enough to lay flat, but at least four inches in length and ½" OD is optimal. Enough pasteurized manure or other fibrous biological waste material is added to the bucket to cover the PVC by about ½ inch, and then the bucket is filled with seawater until it comes out of the hole in the side of the bucket. The PVC should be of a food grade or a household potable water grade and the PVC, the jars, and the lids should be sanitized with Dr. Sato's chlorine concentration.

The delivery system is provided as apertures above the water line of the tank. When water is added to the bucket, the water level increases above the level of the apertures in the bucket allowing delivery of its the contents, which include the beneficial bacteria. However, a pump may also be used as a delivery means. Pumps are well known in the art and may be used to fluidly displace contents from the incubation chamber to the aquatic environment.

Example 2

Growth of Brine Shrimp in an Aquatic Environment and Incubation and Delivery of Beneficial Bacteria to the Aquatic Environment The aquaculture device assembled in Example 1 is tested for its ability to incubate and deliver beneficial bacteria to an outer environment. In this example, the beneficial bacteria are propagated and delivered as food supply to brine shrimp.

Artemia cysts are often called "Brine Shrimp Eggs," and are sold at many pet stores. Live brine shrimp can also be found at pet stores, but are typically wild caught are require special acclimation procedures. The cysts may be hatched more efficiently by following the instructions on the package, but it might be a waste of eggs until the beneficial bacteria become established within the system. Depending on the source of the eggs, a more elaborate method of ensuring biosecurity may be advised, but the bacteria included with the eggs is far more likely to be beneficial than deleterious. A biosecure source of cysts/eggs or live brine shrimp is strongly advised. More eggs can be added in a week if no evidence of life has shown by then, and of course, "Manual on the Production and Use of Live Food for Aquaculture" "Laboratory of Aquaculture and Artemia Reference Center, University of Ghent, Ghent, Belgium" Edited by Patrick Lavens and Patrick Sorgeloos (also referred to herein as "the manual"), which is herein incorporated by reference, can be consulted for helpful suggestions and techniques. Cold weather can slow the hatching and growth.

The artemia are cultured within the aquatic environment. To the 350 gallon tank is added about ⅛ teaspoon of artemia cysts lightly dusted on the surface of the water. Depending on the ambient temperature, the Artemia will begin to grow and reproduce very rapidly. Within a matter of weeks, the entire tank will be filled with Artemia if a food source is available, and perhaps more slowly when depending on solar energy to provide microalgae. Either way, it shouldn't be too long if the weather is not too hot or too cold. If a thick mat of algae grows on the bottom, it should be scraped off at about the time it starts to flake away on its own, cooked at about 160 degrees F. for 30 minutes, and ground up to provide a supplemental food source for the artemia.

About a gallon of the tank water should be filtered into the bucket every day with a screen that doesn't allow baby shrimp to pass through. A very fine net called a "brine shrimp net" can be found at most pet stores, and might be used to filter the water, though I have seen cases where some of the babies will pass through, and finer nets do clog up. Any brine shrimp which are filtered out should be returned to the tank as quickly as possible. Those which pass through can be left in the bucket.

The water should cloud up for a few days before the artemia start multiplying. After that, when the water in the tank becomes clear, the shrimp should be fed. The levels of clarity are described in the manual, and those levels should be observed when possible. Some manures may reduce the clarity of the water, so the guidelines in the manual may be adjusted to reflect that condition. To feed the shrimp:

1) If the water in the bucket is below 85° F., Heat about a gallon of water on a stove to about 120° F. and then slowly add it to the bucket, avoiding a disturbance of the mass of waste at the bottom. If the water in the bucket is above 95° F., very slowly add crushed ice until it is 85° F.

2) Add a tablespoon of very fine flour and a teaspoon of sugar to the bucket and very gently stir it in to the water above the mass of waste so that the waste is slightly disturbed, but not fully mixed. An aeration device can be inserted at this time, and the bucket might be aerated or occasionally gently stirred for the next 20 minutes. The bottom of the aerator should only reach halfway down the bucket. The aerator can be as simple as an airline tube with an air diffuser or airstone attached to keep it at the desired depth. The targeted bacteria in this description do not require oxygen, but a little mixing will help because they can use it and carbon dioxide when it is available; especially when they have been fed.

Other and cheaper micronized food sources such as the ground algae and many other waste products can be substituted for the flour, and the manual provides some suggestions. For the sake of this discussion, it will be referenced as flour, but if I may coin a word, it will be called biomassflour. The term "Biomassflour" as used herein includes be a general embodiment of finely ground waste or feed materials or a combination thereof containing a minimum content of starches, sugars, lipids, and digestible proteins; relative to the plant cellulose, difficult to digest carbohydrates (like chitin), and difficult to digest proteins (like keratin) of the ingredients. It will be ground to a micronic specification and provide a reasonable expectation of nourishment and a reasonable expectation of biosecurity and a reasonable limitation or absence of hazardous chemicals similar to USDA standards for animal feeds. The standards will be refined later.

On the first three to five feedings; steps 1 and 2 are repeated only once, and the tank should be almost clear before another feeding.

On subsequent feedings, steps 1 and 2 are repeated every 20 minutes until the water in the tank is too cloudy according to the manual or the tank becomes filled to the fill line. The quantity of feed should be adjusted so that feeding process does not require too many repetitions with a gap of approximately 4 hours between one feeding and the next. The feeding quantities should be lowered relative to the amount of adults harvested and the feed conversion ratio of the species relative to the flour used when the system is fully balanced. More sugar is added if nitrate levels increase and less sugar is added if the nitrates are good. Other elements of microbial control should be followed relative to the species. Brine shrimp species are generally tolerant of all of the nitrogen derivatives, so only nitrates are mentioned for the improvement of water quality, and for creating animal food from waste material. There are some books which cover microbial control and there are still many things to learn and discover. Most of the books and articles are species dependant.

If the tank is too cloudy according to the manual and not up to the fill line, then feeding is finished, but fill up tank to the fill line with fresh water to compensate for daily evaporation loss. Seawater maybe added if an end product of concentrated saline is desired. Rainfall presents a highly probable dilutive force. Covering the system with a tarp may be necessary if high rainfall is expected. Local conditions will dictate many aspects of the culture. When local temperature is hot, the tank could be shaded, and the feeding process will involve ice.

When it is cold, the feeding process could involve more and hotter water to elevate the temperature of the bacteria. Automated controls should be added if they can be afforded so that the bacteria grow well in all weather. The bacteria feed the fish, and control the water conditions.

About an hour after the feeding, check the water clarity again. If it is not completely cleared, then you have a good starting point for future feedings. If it is cleared, you should repeat the process with a larger quantity of flour and sugar after verifying that certain water quality levels are adequate and waiting an appropriate period after adding waste products. The manual provides certain criteria for pH. When the tank pH is under 7, I suggest that nejayote water should be added to the bucket until the bucket pH reaches about 7.4, but only enough nejayote should be added to adjust the pH of the water in the bucket. Nejayote is the wastewater from the manufacture of Tortillas and contains lime. It should be handled with care, because lime is corrosive. The amount of lime will vary between makers, so start with about 1 cup of nejayote, and adjust your additions according to the readings which follow the addition and mixing. Wait about 10 minutes after deeply mixing the first cup of nejayote into the bucket of food and waste and then take the pH again. The deep mixing should be deeper than the gentle stir of the food mixing, but not deep enough to disturb the wastes at the very bottom of the bucket. Wait no less than an hour after adding nejayote to start another feeding, but do repeat feeding as soon as possible if the tank is clear enough. Pre-cooking a cellulose rich solid waste or settled solid in the nejayote in Stainless Steel at a temperature about 160° Fahrenheit for about 30 minutes before adding it to the bucket will reduce the cellulose of the waste much faster, though much of the power of the nejayote is lost in the original process of making tortillas, and the heat will be expensive unless the bucket needs to have its temperature elevated significantly already. This is a great winter activity, as heating the nejayote will warm the house and the hot nejayote will warm the bacteria in the bucket. Take care not to melt the bucket. If nejayote is not available, consult the manual for pH adjustments. Marble chips can be added to the bucket as well. These can be purchased at a home improvement store in the garden section. Add a few every day and keep monitoring the pH. If the pH rises too high, then remove half of the chips. If enough chips are added to cover the waste, then the mixing processes become easier, and the bucket can be stirred more vigorously, and the aeration can be deeper, and cleaning will be easier.

At this point, the incubation should be enhanced by maintaining the bucket temperature near 90° F., that is, right after you have just adjusted the pH in the bucket to 7.4. You can place a sealed water bottle in the bucket which is higher or lower than the temperature inside the bucket to simulate the heating or cooling process of the device which was also effectively simulated during the feeding process. Some water will be displaced into the tank, but that will also efficiently reduce the volume of water to be controlled and will not substantially affect the ecology of the tank. If the temperature differential between the tank and the bucket is significant, then the bacterial processes will be much slower. You might want to build a solar water heater, or use ice to cool the bucket more often. Electrical devices near saltwater can be very dangerous, and should be avoided. Heating and cooling coils supplied by a securely fixed and thoroughly insulated and ground faulted electrical heat exchanging system outside the tank are preferable if the labor of switching bottles becomes tedious and the funds to build the actual invention are available. A coiled plastic (potable water grade) hose can be coiled in a water reservoir of the target temperature of 90° F., and then into the bucket and coiled again and ran back to the reservoir. A pump can be used to circulate the water continuously.

The system might crash before the right balance of bacteria is established, but this effect can be minimized by harvesting a large amount of brine shrimp before it does. Try to remove about half of the adult brine shrimp in the tank every day by swishing a net through the tank, and putting about half of them back. There will still be shrimp in the tank because you won't catch them all. If the net doesn't catch very many, then stop harvesting for a period of 6-12 days in the early stages of establishing a bacterial balance. Once the balance is established, the harvest can be adjusted to fluctuating levels of adults and babies by visual observation and experience. The harvesting net should be of a coarseness which avoids harvesting babies and prefers adults and is typically sold in pet stores as an "Aquarium Net," though some stores may sell a finer net with that name. It should be relatively coarse compared to the brine shrimp net they sell. Net comparisons and trials will assist in selection. Various forms of waste fabric can also be used. Check your local thrift store for clothing discards and make nets out of different fabrics.

If the system does crash, don't panic. Just wait and stop feeding. Try to siphon the bottom sludge off the bottom of the tank, and put it in the bucket. There should be enough survivors in the tank, but if 2 weeks pass, dust a few more eggs on the water and wait another two weeks. Maintain the water level, and test every water quality parameter that you can.

The manual provides other water quality criteria which should be monitored, but the most important one is bottom sediments and growths. They should be swept or scraped, then siphoned off the bottom into a large container similar to the bucket about twice a week. A sump can be dug next to the tank to improve the siphon flow. A very economical drill pump can be purchased from some home improvement stores. Make sure your electrical outlet is Ground Fault Interrupt (GFI) enabled, and be very careful with electricity near salt water. A siphon and a sump are much safer for the cleaning, but the pump can be used to return the water to the tank. After the water in the container is settled, the brine shrimp can be slowly poured back into the tank until the debris starts to pour out, and the debris should be gently poured or bailed into the bucket to avoid major disturbance to the bottom of the bucket. It can also be rinsed with fresh water, and fed to land snails capable reducing cellulose. The rinse water can be returned to the tank. If a small number of brine shrimp end up lost in the process, it is efficient enough. After any waste is dumped into the bucket, it should settle for about an hour before the next feeding. If too much waste is returning to the tank, a screen can be added to the hole in the bucket to reduce that and insure that finer grains of food are introduced into the tank. The screen might need to be cleaned from time to time, and other methods are recommended in the manual.

Once the bacterial colonies have been established the replication processing can occur. The bacterial processes will primarily be recognized by testing the water for ammonia, nitrates, and nitrates. All levels should fall from their peak and resist further declines at a level of stabilization unless specialized additives are incorporated. The system is replicated by building a duplicate and slowly adding seawater to the original tank, while slowly placing the mixed water into the replicant tank. At the bottom of the bucket, there should be a colony of anaerobic bacteria which will die if exposed to too much oxygen. They are replicated by removing one of the small jars in the old system, and placing it in the new system. A new replacement jar should be placed in the old system including the leaves and sticks. After the small jar is placed into the bucket of the replicated system, about half of the sludge and water should be transferred from the original system, and both chambers should be filled with water from the tanks. A system should not be replicated if it emits a foul odor during normal operation even if the other water variants are correct, but foul odors may occur during the replication process. A slightly sour yeast smell is normal during operation; but a fresh, salty, ocean breeze is even better.

After you run out of room by replicating the systems, you may begin beneficial water and waste processing or enhance the system to increase production. Solid Waste processing is accomplished by adding various materials to the bucket, and determining if they are a good food source for the bacteria and the brine shrimp or too bulky to be dissolved quickly enough by the lime or digested by the bacteria. Water treatment is accomplished by adding seawater which has high levels of a particular element which your water does not have, and delivering your water to a system which requires a nutrient that you have a high level of. Since you added lime, your calcium content will be high, and a coral propagation system owner should appreciate your water, and may have depleted water to return. Unfortunately, releasing such water to the environment usually requires certain government approvals and certifications of quality. Often, they will require that your water is treated as waste, even when it is beneficial. I actually favor sequestration of beneficial and pathogen free water over its disposal. A system with activated charcoal will actually sequester some very dangerous materials, and those materials are absorbed by the charcoal.

In the end, you will probably still end up with a cellulose rich sludge product and further means of carbon sequestering reduction of the cellulose are recommended, including, but not limited to feeding the sediments to a tank full of ravenous sea snails which can digest any algae growth. Some snail species will also digest the concentrated cellulose of the brine shrimp waste, and the early use of the waste is advised to provide the snails with sustenance that is more nutritious than cellulose alone and/or to enhance the carbon sequestration process by encouraging the snails to multiply. Sea snails are readily available at most "reef stores" (a pet shop that specializes in coral reef replication), but care must be advised. Snails are known to harbor pathogens, though "Pathogen Free" snails should have evolved by a process known as "serial dilution," the industry is awaiting a scientific confirmation. If any such animal is in your system, you cannot return any water to the ocean. It would be difficult to do so anyway, because most Fish and Game departments forbid returning water or animals to the ocean as a biosecurity precaution, but pasteurized sea snails would still create a viable feed supply for many captive animals which in turn feed humans.

Many of the other nutrients will be used by the brine shrimp and the bacteria, and the biomass of the input stream will be incrementally reduced in the form of food for the target species. Some gasses will be released into the atmosphere, but more of the energy will be converted to biomass than in other processes such as digester systems and combustion, which directly convert the mass into energy and contribute carbon dioxide to the atmosphere. While many scientists are focusing on the conversion of biomass to energy, this system focuses on a partial reversal, with particular attention given to organisms which convert cellulose to edibles, thereby creating a food source from otherwise wasted materials. Furthermore, when sufficient edibles are available, the next natural process of an organism is to create lipids which are much more usable as a convenient energy source. Lipids from some food wastes of today are economically converted into biodiesel. Lower food chain items have proven difficult to convert, but that is no reason to stop trying.

What is claimed is:

1. A method for depleting phosphate content in an aquatic environment comprising:
    a) culturing a group of aquatic microorganisms commonly referred to as biofloc, comprising an aquatic suspension containing various microflora including fungi, yeasts, bacteria and algae, for the feeding of a target species in an aquaculture system, wherein the biofloc is capable of producing a food source for the target species, further wherein the biofloc allows for the periodic addition of ammonia to the system to produce additional proteins, further wherein the biofloc becomes capable of reducing dissolved phosphate through specialized intensive aquaculture of selected organisms and/or the combination of the microflora and target species of an aquatic animal species creates the capability of reducing dissolved phosphate through specialized intensive aquaculture;
    b) removing water from the aquaculture system, including the biofloc, and optionally removing the target species;
    c) determining the phosphate and ammonia content of an aquatic environment;
    d) delivering the biofloc to an aquatic environment if the phosphate concentration is above a predetermined concentration and ammonia concentration is below a threshold level to partially deplete the phosphate content;
    e) retesting parameters to determine further remediation steps, including ammonia as an immediate rise in ammonia is expected; and optionally
    f) remediating excessive ammonia by adding carbohydrates while monitoring dissolved oxygen levels, wherein carbohydrates are added in a manner to prevent eutrophy unless an oxygen support system is available; and optionally,
    g) harvesting the resultant biofloc produced for use as lipid enriched product for food or fuel production.

2. A method to increase the lipid content of a biofloc comprising:
    a) culturing a group of aquatic microorganisms commonly referred to as biofloc, comprising an aquatic suspension containing various microflora including fungi, yeasts, bacteria and algae, for the feeding of a target species in an aquaculture system, wherein the biofloc is capable of producing a food source for the target species, further wherein the biofloc is capable of allowing for the periodic addition of ammonia to produce additional proteins, and further wherein the biofloc becomes capable of reducing dissolved phosphate through specialized intensive aquaculture of selected organisms and/or the combination of the microflora and target species of an aquatic animal species creates the capability of reducing dissolved phosphate through specialized intensive aquaculture;
    b) removing a portion of the water from the aquaculture system, including the biofloc, and removing the target species with appropriate nets, strainers or sieves, and placing the biofloc/water combination in a separate container; and
    c) adding a phosphate fertilizer and/or phosphate laden wastewater and/or other phosphate rich nutrient, to the containment of water and biofloc which was separated from the aquaculture system in step (b).

* * * * *